Figure 1:
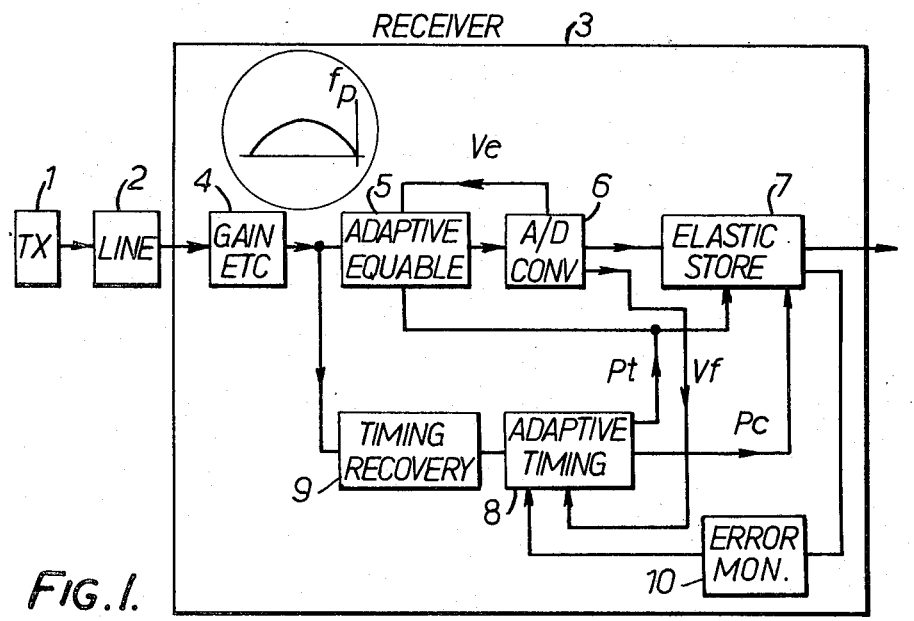

United States Patent [19]
Bennett

[11] 3,990,010
[45] Nov. 2, 1976

[54] DATA TRANSMISSION SYSTEMS

[75] Inventor: Jeffrey Henry Bennett, Maidenhead, England

[73] Assignee: Plessey Handel und Investments A.G., Zug, Switzerland

[22] Filed: Oct. 3, 1974

[21] Appl. No.: 511,651

[30] Foreign Application Priority Data
Oct. 5, 1973   United Kingdom................ 46733/73

[52] U.S. Cl. ................................ 325/42; 325/323
[51] Int. Cl.² .......................................... H03H 7/36
[58] Field of Search ............ 325/38 A, 41, 42, 321, 325/323; 178/69 R; 333/17 R, 18; 328/155, 162; 340/174.1 D

[56]   References Cited
UNITED STATES PATENTS

| 3,573,623 | 4/1971 | Bannon et al. .......................... 325/42 |
| 3,727,136 | 4/1973 | Schroeder et al. ................... 325/4 Z |
| 3,775,688 | 11/1973 | Hinoshita et al. ................... 325/38 A |
| 3,864,632 | 2/1975 | Chang .................................... 325/42 |
| 3,906,347 | 9/1975 | Motley et al. ...................... 333/18 X |

*Primary Examiner*—Benedict V. Safourek
*Attorney, Agent, or Firm*—Fleit & Jacobson

[57]   ABSTRACT

A data transmission system comprising an adaptive equalizer, the output of which is selectively adjusted and sampled for distortion equalization purposes, and means for varying the sampling time of the adaptive equalizer to effect greater distortion equalization.

12 Claims, 2 Drawing Figures

DATA TRANSMISSION SYSTEMS

This invention relates to data transmission systems and relates more especially to data transmission systems which incorporate adaptive equalisation for error rate minimisation purposes.

In data transmission systems in which data is transmitted over lines, the transmitted data suffers from both amplitude and phase distortion due to the characteristics of the line and to minimise the effects of such distortion it has been proposed that an adaptive equaliser be incorporated in the receiver, the adaptive equaliser being continually adjusted to equalise the line distortion. In practice the output of the equaliser is sampled at preset times derived from a pilot signal and normally this sampling time is fixed relative to the pilot signal. However, it has been found that the optimum sampling time varies with the nature and degree of distortion of the received signal so that by suitably varying the sampling time of the equaliser relative to the pilot signal the data error rate may be further reduced.

According to the present invention there is provided a receiver for use in a data transmission system, the receiver comprising adaptive equaliser means which is selectively adjusted and sampled for distortion equalisation purposes, and means for varying the sampling time of the adaptive equaliser means to effect greater distortion equalisation.

In carrying out the invention the sampling time may be varied relative to a fixed reference e.g. a timing pilot signal received by said receiver, and in a preferred arrangement means for monitoring the error rate of said system will be provided, the sampling time of the adaptive equaliser means being changed in discrete increments in one direction e.g. increased, until an increase in error rate is detected at which time said sampling time is changed in discrete increments in the other direction e.g. decreased.

In an especially preferred arrangement the receiver will be arranged to receive a multi-level analogue signal, analogue-to-digital converter means being provided for converting said signal into a digital signal consisting of a plurality of bits, a number of said bits affording data information, a next succeeding bit corresponding to an error bit which is used to cause a characteristic of the adaptive equaliser means to be varied and a still further next succeeding bit corresponding to a further error bit which is used to vary the sampling time of said equaliser means. In an arrangement in which the multi-level analogue signal is of seven level form, the analogue-to-digital converter means will be arranged to afford a five bit digital output signal, the first three bits thereof affording the data information, the fourth bit being used for causing the characteristic of the adaptive equaliser means to be varied and the fifth bit being used for varying the sampling time of said equaliser means.

In one arrangement for carrying out the invention the analogue-to-digital converter means may be connected to an output of the adaptive equaliser means, a timing recovery circuit being provided for affording an output corresponding to a timing pilot signal received by said receiver, an output of the timing recovery circuit being applied to an adaptive timing circuit which is used to control the sampling time of the adaptive equaliser means and the analogue-to-digital converter means, the output from the analogue-to-digital converter means corresponding to the error bit being applied to the adaptive equaliser means to vary the characteristic thereof and the output from the analogue-to-digital converter means corresponding to the further error bit being applied to the adaptive timing circuit for varying the output afforded thereby.

Conveniently an elastic store means may be provided to which the output from the analogue-to-digital converter means is applied, the elastic store means being arranged to admit information at the variable sampling time determined by the adaptive timing circuit and being arranged to output information at a fixed sampling time determined, for example, by the output afforded by the timing recovery circuit.

Preferably the timing recovery circuit will comprise band-pass filter means arranged to pass the frequency of a received timing pilot signal, and sine-to-square wave converter means operable on the output of the said filter means for affording a square wave output corresponding to the timing pilot signal and the adaptive timing circuit will comprise counter means for counting the further error bits from the analogue-to-digital converter means, count timer means operable on the output of the counter means, and a timing adjust counter to which the outputs from the counter means and the count timer means are applied, the output from the timing adjust counter being applied to digital-to-analogue converter means which affords an output which is applied as one input to phase-locked oscillator means, another input of which is derived from the timing recovery circuit, the phase-locked oscillator means affording an output which is applied to the adaptive equaliser means and the analogue-to-digital converter means.

Conveniently the timing adjust counter may take the form of an UP/DOWN counter, the output from the count timer means being applied to the UP/DOWN counter to set it to its "up" or "down" state, and error monitor means operable on the output from the elastic store means, and fault recognition means to which the output from the error monitor is applied may be provided, the fault recognition means being effective when the error rate exceeds a predetermined level for causing the UP/DOWN counter to be successively scanned in both an up and down direction until the error rate falls below a predetermined level.

Figure 2:
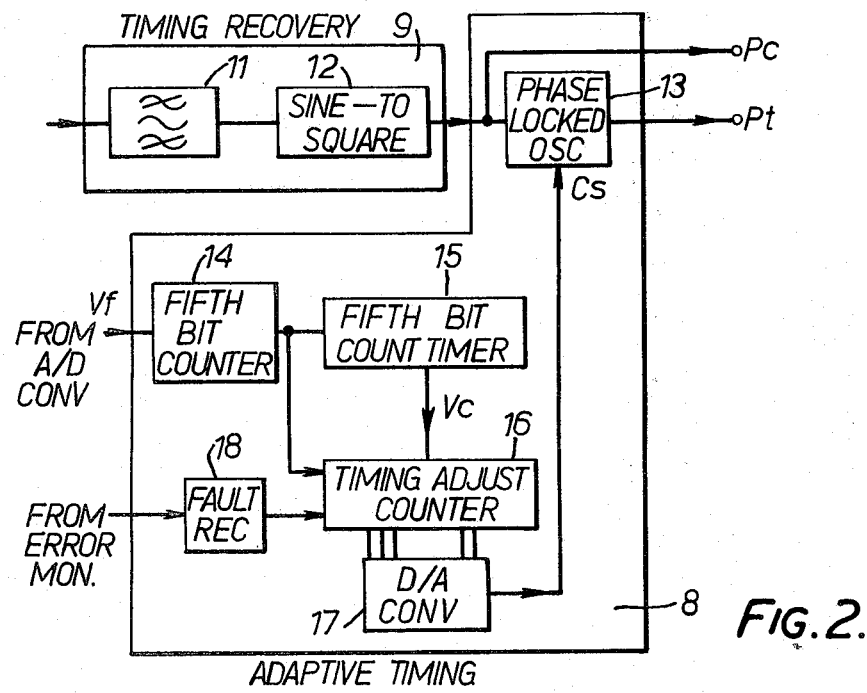

An exemplary embodiment of the invention will now be described with reference to the accompanying drawings, in which:

FIG. 1 is a block schematic diagram of a data transmission system incorporating a receiver according to the present invention; and FIG. 2 is a block schematic diagram showing, in greater detail, part of the receiver of FIG. 1.

In the data transmission system depicted in FIG. 1, there is shown a transmitter 1 which is effective for transmitting data over a line 2 to a receiver 3. Due to the characteristics of the line 2, the transmitted data suffers from both amplitude and delay distortion which results in errors in the received data. In the embodiment to be described the data transmitted by the transmitter 1 will be in the form of a seven level analogue signal and although not shown in the arrangement of FIG. 1, this data signal may be one of a number of signals superimposed on a suitable carrier, for example using frequency division multiplexing techniques, requiring consequent modulators and demodulators which are not shown in the arrangement of FIG. 1. Ideally each data signal will be transmitted together with a timing pilot signal.

In the receiver 3 of FIG. 1, the received data is amplified (and if necessary demodulated) in gain circuit 4 to afford a baseband signal having a half-sinewave characteristic as shown in the 'balloon' in FIG. 1, the timing pilot $f_p$ being shown at the upper frequency end of the baseband signal. The output from the gain circuit 4 is applied to an adaptive equaliser 5 which is arranged to be adjusted to equalise the distortion imposed on the data by the line 2 thereby to improve the error rate of the received data signal. The equaliser 5 may conveniently comprise an analogue delay line having a plurality of preferably equally spaced taps, the output from each tap being fed to a summing amplifier via a variable gain device to produce an equalised output. The individual tap gains may be controlled automatically according to a modified mean square error algorithm using an error signal $V_e$ derived (as will be described hereinafter) from an analogue-to-digital converter 6 to which the equalised output from the adaptive equaliser 5 is applied. The adaptive equaliser 5, the analogue-to-digital converter 6 and an elastic store circuit 7, the purpose of which will be described later, are provided with timing pulses afforded by an adaptive timing circuit 8, a reference timing signal derived from the timing pilot signal $f_p$ being applied to the adaptive timing circuit 8 via a timing recovery circuit 9 to which the output from the gain circuit 4 is applied.

As has been hereinbefore mentioned the optimum sampling time of the adaptive equaliser 5 varies with the nature and degree of distortion of the received signal and to account for this it is arranged that the timing pulses $P_T$ afforded by the adaptive timing circuit 8 are made variable in dependence upon a further error signal $V_f$ derived from the analogue-to-digital converter 6. Since the output from the analogue-to-digital converter will vary in accordance with the timing pulses $P_T$ afforded by the adaptive timing circuit 8, it is desirable that it is re-cycled so that the output is afforded at a constant clock rate. This is effected by the elastic store 7 into which the data from the analogue-to-digital converter 6 is clocked at the variable timing rate $P_T$ and in which the output is clocked out at a fixed clock rate $P_c$ which is derived directly from the timing pilot signal $f_p$ by the adaptive timing circuit 8. In addition an error monitor circuit 10 is provided for monitoring the output of the elastic store 7 and for modifying the operation of the adaptive timing circuit 8 as will be described hereinafter with reference to FIG. 2.

Before considering the detailed operation of the timing recovery circuit 9 and adaptive timing circuit 8 of the system of FIG. 1, it is convenient to consider the operation of the analogue-to-digital converter 6 on the equalised output from the adaptive equaliser 5, this output being in the form of a seven level analogue signal. Each sampled input to the analogue-to-digital converter is amplified and sampled over a ½ symbol period, and then staticised, or held, for a ½ symbol period. During the hold period, successive stages of rectifiers having progressively smaller d.c. offset outputs quantise the sample, while earth referenced comparators produce a digital representation of its voltage in a 5-bit code. The first three bits of the code are representative of the particular one of the seven levels that corresponds to the particular sample, the fourth bit is indicative of the sampled level being greater or less than the mean value of the particular level, and the fifth digit is indicative of whether the sampled level is nearer to the mean value of a particular level or nearer to the upper or lower limits of that particular level. The fourth and fifth bits of the 5-bit code are, in fact, indicative of data errors, and the fourth bit is used to derive the error signal $V_e$ for application to the adaptive equaliser 5 and the fifth bit $V_f$ is applied to the adaptive timing circuit 8 of the system of FIG. 1 for controlling the adaptive timing of the adaptive equaliser 5 as will now be described with reference to FIG. 2.

The arrangement of FIG. 2 shows in greater detail the timing recovery circuit 9 and the adaptive timing circuit 8 of FIG. 1 in greater detail. The output from the gain circuit 4 of the system of FIG. 1 is applied to a bandpass filter 11 in the timing recovery circuit 9, the bandpass filter 11 being tuned to the frequency of the timing pilot $f_p$ so that the timing pilot is filtered from the remainder of the received information and is applied to a sine-to-square wave converter 12 which affords a squarewave output $P_c$ at the frequency of the timing pilot $f_p$. The output from the sine-to-square wave converter is applied to a phase-locked oscillator circuit 13 in the adaptive timing circuit 8, which affords an output $P_T$ which is phase locked to the timing pilot $f_p$, but which may be displaced in phase relative thereto in dependence upon an applied analogue control signal $C_S$ so as to maintain the error rate of the system at the lowest possible level. The output $P_T$ may be used to derive timing signals of varying durations as required throughout the data transmission system.

Control of the analogue signal $C_S$ applied to the phase locked oscillator 13 is derived from the fifth bit signal $V_f$ from the analogue-to-digital converter 6 (FIG. 1) the number of fifth bits being counted in a fifth-bit counter 14. The fifth-bit counter 14 may conveniently comprise a capacitor which is arranged to be charged incrementally, one increment of charge being applied for each fifth-bit pulse applied to the circuit. The output from the fifth-bit counter is applied to a fifth-bit count timer 15 which effectively measures the time taken for the capacitor of the fifth-bit counter 14 to "overflow" and affords a control signal $V_c$ to a timing adjust UP/DOWN counter 16 to which the output of the fifth-bit counter 14 is also applied. The UP/DOWN count of the timing adjust UP/DOWN counter 16 is controlled by the control signal $V_c$ from the fifth-bit count timer 15 and is moved up or down one increment each time an output is afforded from the fifth bit counter 14. Thus, if between successive outputs from the fifth-bit counter 14, the count of the fifth-bit count timer 15 increases, this is indicative of the error rate falling, and the timing adjust UP/DOWN counter 16 is maintained in either its up or down state and is incremented in that direction by the output from the fifth-bit counter 14. The fifth-bit count timer 15 again measures the time to the next successive output from the fifth-bit counter 14 and if the count of the fifth-bit count timer 15 again increases, indicating a further decrease in the error rate, the timing adjust UP/DOWN counter 16 is again maintained in either its up or down state and is further incremented and the process repeated. If, however, the count of the fifth-bit count timer falls, indicating an increase in the error rate, the fifth-bit count timer affords an output over the control output $V_c$ which changes the UP/DOWN counter 16 from the down state to the up state or vice-versa, the UP/DOWN counter 16 therefore being moved in the opposite direction and the process repeated. The 5-bit output of the UP/DOWN counter 16 is applied to a digital-to-analogue converter 17, which converts the 5-bit signal to one of 32 analogue signals which is applied to the phase locked oscillator 13.

If, for some reason the error rate of the system is abnormally high, as indicated by the error monitor 10 of FIG. 1, as would be obtained when the system was initially turned on or after a break in transmission, then it is arranged that the operation of the down counter of the timing adjust counter 16 is changed from an "adaptive" mode as described above to a "scanning" mode. This is achieved by means of a fault recognition circuit 18 to which the output from the error monitor 10 of the arrangement of FIG. 1 is applied, the fault recognition circuit affording an output to the timing adjust UP/DOWN counter 16 which inhibits its adaptive operation and causes it to be successively scanned in both an up and down direction until the error rate of the system falls below a predetermined level at which time the scanning mode is inhibited and the adaptive timing control of the adaptive equaliser based on the fifth-bit error rate is initiated.

Although described in connection with a specific form of data transmission system, it should be appreciated that the adaptive timing system described may be used in any system incorporating an adaptive equaliser.

What we claim is:

1. A receiver for use in a data transmission system, the receiver comprising adaptive equalizer means, means for applying a received signal to the adaptive equalizer means, a reference frequency source, timing means, including the reference frequency source, for causing the adaptive equalizer means to be sampled for distortion equalization purposes, distortion monitoring means operable on the received signal for affording an output indicative of the distortion of the received signal and adaptive timing means operable in association with timing means for causing the sampling of the adaptive equalizer means to be varied relative to the reference frequency source in dependence upon the output of said distortion monitoring means.

2. A receiver according to claim 1, comprising timing recovery means to which the received signal is applied for extracting a timing pilot signal therefrom, the output of the timing recovery means constituting the reference frequency source.

3. A receiver according to claim 2, comprising error monitoring means for monitoring the error rate of said system, the adaptive timing means being arranged to cause the sampling of the adaptive equalizer means to be changed in discrete increments in one direction relative to the reference frequency source until an increase in error rate is detected and then to be changed in discrete increments in the other direction.

4. A receiver according to claim 3, which is arranged to receive a multi-level analogue signal, wherein said distortion monitoring means comprises analogue-to-digital converter means for converting said analogue signal into a digital signal consisting of a plurality of bits, a number of said bits affording data information, a next succeeding bit corresponding to an error bit being indicative of whether the analogue signal is greater or less than the mean value of one of said levels, and a still further next succeeding bit corresponding to a further error bit being indicative of whether the analogue signal is nearer to the mean value of one of said levels or nearer to the upper or lower limits of said one of said levels.

5. A receiver according to claim 4, in which the digital-to-analogue converter means is connected to the output of the adaptive equalizer means.

6. A receiver according to claim 4, in which the error bit of the digital signal is applied to the adaptive equalizer means for causing a characteristic thereof to be varied and in which the further error bit of the digital signal is applied to the adaptive timing means for varying the output afforded thereby.

7. A receiver according to claim 6, comprising elastic store means to which the output of the analogue-to-digital converter means is applied, the output from the adaptive timing means being applied to the elastic store means for admitting information thereto and the output from the reference frequency source being applied to the elastic store means for outputting information therefrom.

8. A receiver according to claim 4, in which the adaptive timing means comprises counter means for counting the further error bits from the analogue-to-digital converter means, count timer means operable on the output of the counter means, a timing adjust counter to which the output from the counter means and the count timer means are applied digital-to-analogue converter means to which the output of the timing adjust counter is applied, phase-locked oscillator means to one input of which the output of the digital-to-analogue converter means and to a second input of which is applied the output from the timing recovery means, the phase-locked oscillator means affording an output which is applied to the adaptive equalizer means and the analogue-to-digital converter means.

9. A receiver according to claim 8, in which the turning adjust counter comprises an UP/DOWN counter, to which the output from the count timer means is applied for setting it to its "UP" or "DOWN" state.

10. A receiver according to claim 9, in which the error monitor means is operable on the output of the elastic store means, fault recognition means being provided to which the output from the error monitor means is applied, the fault recognition means being effective when the error rate exceeds a predetermined level for causing the UP/DOWN counter to be successively scanned in both UP and DOWN directions until the error rate falls below a predetermined level.

11. A receiver according to claim 1, in which the timing recovery means comprises bandpass filter means arranged to pass the frequency of a received timing pilot signal, and sine-to-square wave converter means operable on the output of said filter means for affording a square wave output constituting the reference frequency source.

12. A data transmission system comprising a receiver according to claim 1 and a transmitter connected to said receiver by a transmission line.

* * * * *